United States Patent [19]

Muzzarelli

[11] Patent Number: 4,669,254
[45] Date of Patent: Jun. 2, 1987

[54] PLANT FOR PRODUCING PLASTIC CURD CHEESES

[76] Inventor: Gabriele Muzzarelli, Via Marzabotto, 116, 41100 Modena, Italy

[21] Appl. No.: 782,563

[22] Filed: Oct. 1, 1985

[30] Foreign Application Priority Data

Dec. 17, 1984 [IT] Italy ................. 24075 A/84

[51] Int. Cl.$^4$ .......................................... B65B 63/00
[52] U.S. Cl. .................................... 53/518; 53/576;
  99/453; 99/462; 99/535
[58] Field of Search ................. 53/518, 576, 127;
  426/582, 36; 99/453, 462, 535

[56] References Cited

U.S. PATENT DOCUMENTS

| | | | |
|---|---|---|---|
| 813,375 | 2/1906 | Glauser | 53/518 X |
| 2,735,378 | 2/1956 | Vogt | 53/518 |
| 3,078,170 | 2/1963 | Leber | 426/582 |
| 3,704,136 | 11/1972 | Lavarda | 426/582 |
| 4,309,941 | 1/1982 | Brockwell | 426/582 |
| 4,479,283 | 10/1984 | Hollingsworth | 53/576 |

FOREIGN PATENT DOCUMENTS 939250  1/1974  Canada ................. 53/576

Primary Examiner—John Sipos
Attorney, Agent, or Firm—Oblon, Fisher, Spivak, McClelland & Maier

[57] ABSTRACT

A plant for producing plastic curd cheeses such as mozzarella, caciocavallo and the like, comprising at least one device for chopping the curd, at least one kneading device for kneading the chopped curd with an aqueous liquid, at least one plasticizing device with mechanical implements for plasticizing the kneaded curd to obtain plastic curd, an extruder fed with plastic curd and feeding the plastic curd into a tubular sheath, and an apparatus for cutting and closing predetermined sections of tubular sheath filled with plastic curd.

10 Claims, 9 Drawing Figures

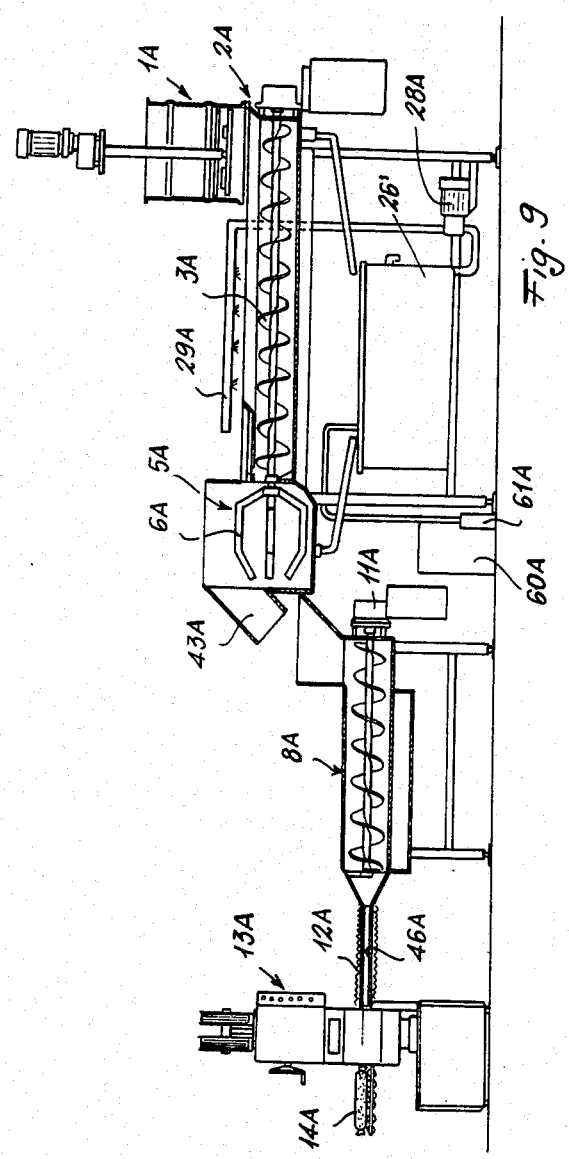

PLANT FOR PRODUCING PLASTIC CURD CHEESES

FIELD OF THE INVENTION

This invention relates to a plant for producing plastic curd cheeses, such as mozzarella and caciocavallo.

BACKGROUND OF THE INVENTION

Conventional plants for producing plastic curd cheeses from curd obtained by the usual methods comprise:

(a) a curd cutting device into which the curd is loaded in the form of, for example, approximately 20 kg blocks for reduction into fragments or slices;

(b) kneading and plasticising devices comprising screws operating in a tank which is fed both with the curd fragments or slices originating from the curd cutter and with hot water, and mechanical implements in the form of dipping arms or rotary paddles which give the plastic mass delivered by said screws a structure which is fibrous to a greater or lesser extent depending on the type of cheese required;

(c) forming devices which receive the product from the kneading and plasticising machines and divide it into shaped pieces (cylindrical, parallelepiped or spherical) by means of moulds;

(d) hardening devices where the pieces from the forming machines are hardened by being moved countercurrently with circulating water to cool from a temperature of about 50°–65° C.;

(e) salting tanks in which the cooled pieces are placed and are left for a certain time to enable the salt to penetrate into the body of said pieces; and (f) rooms in which the salted pieces are cured or are packaged.

As stated, the pieces which leave the forming devices have a temperature which varies from 50° to 65° C. depending on the type of cheese to be obtained. In order for these pieces to maintain their shape and to enable the subsequent curing, packaging, storage and dispatch operations to be carried out, their internal temperature must be reduced to 15°–25° C. These pieces are hardened either in or out of moulds depending on their shape and size. Cooling must take place gradually so as not to subject the pieces to thermal shock. This cooling is implemented by placing the pieces in stainless steel tanks generally having a length of from 8 to 20 meters or more, and the pieces are moved countercurrently with a stream of water so that they come initially into contact with water at about 15°–25° C., and then with increasingly colder water which can reach 4° C.

This obviously results in:

a considerable water and energy consumption;

a considerable space requirement;

the need for careful cleaning and sterilising of the tanks which, being uncovered and operating at temperatures which favour bacteria development, represent an environment very favourable to contamination of the pieces, which reduces their life, results in production rejects, and leads to considerable product rejection by the purchaser; and the need for manual labor in inserting the pieces into moulds (if used), loading the moulds into the tanks, and then extracting the hardened pieces from the moulds.

The subsequent brine treatment which, according to the type of cheese and the size of the pieces can vary from a few hours to some weeks, also requires tanks of considerable length, leading to some of the aforesaid drawbacks of the hardening tanks. Moreover, because of the slowness with which the salt penetration takes place, dairies which produce cheeses in large pieces have to use large rooms (up to 20 m×20 m) for the salting operation. To this drawback must be added the fact that the saline solution must be periodically regenerated, requiring further manual labour, the need for vessels used only for this purpose, and considerable energy consumption.

OBJECT OF THE INVENTION

The main object of the present invention is therefore to provide a plant for producing plastic curd cheeses which, by not requiring salting and hardening tanks, is extremely compact and is free from the drawbacks associated with the use of such tanks.

SUMMARY OF THE INVENTION

This and further objects which will be more apparent from the detailed description given hereinafter are attained according to the invention by a plant characterised essentially by comprising at least one curd cutter for chopping the curd, plasticising and kneading devices which receive the chopped curd in order to knead and plasticise it to obtain a plastic curd, an extruder device receiving the plastic curd and comprising an elongated extrusion pipe with an outlet and acting as a reservoir for a tubular sheath into which the plastic curd is extruded, and a device disposed at the outlet in order to separate and close sections or portions of sheath filled with plastic curd.

According to an important aspect of the invention, the salting takes place in the kneading device by the use of saline solution metering means operationally correlated with the curd cutter in such a manner as to proportion the added salt to the quantity of curd supplied by the curd cutter.

BRIEF DESCRIPTION OF THE DRAWINGS

The invention will be more apparent from the detailed description given hereinafter with reference to the accompanying drawing, in which:

FIG. 9 is a modified embodiment of the plant according to the invention.

DETAILED DESCRIPTION OF THE PRESENTLY PREFERRED EMBODIMENTS

Figure 6:
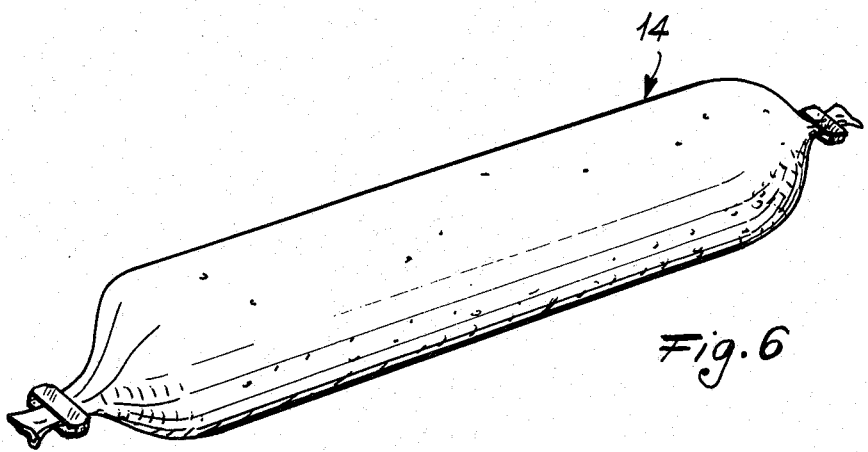
FIG. 6 is a perspective view of a substantially cylindrical pack of plastic curd cheese.
Figure 7:
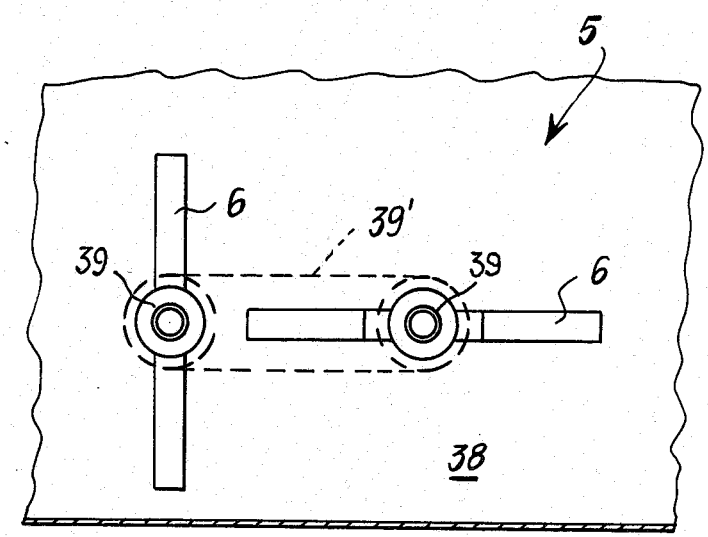
FIG. 7 is a partial section with parts omitted, taken in the direction of the arrows VII—VII of FIG. 1.
Figure 8:
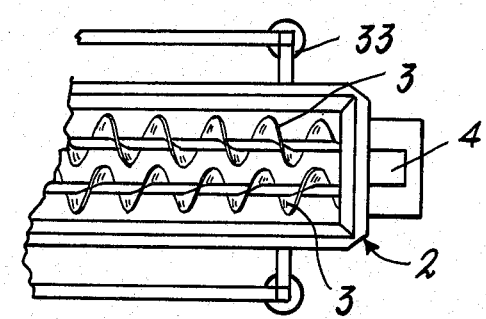
FIG. 8 is a diagrammatic plan view of a part of the kneading device.

With reference to FIGS. 1 to 8, the embodiment shown comprises: a cutting device 1 into which curd obtained by conventional methods is fed and cut into pieces or slices; a heated elongated tank 2 into which the pieces or slices of curd fall and are kneaded with water by means of two screws 3 driven by an adjustable geared motor unit 4; a plasticising device 5 comprising rotary paddles 6 driven by an adjustable geared motor unit 7 of reversible direction of rotation for working the kneaded mass supplied by the screws 3; an extruder 8 with a screw 9 in a heated cylinder 10 and driven by an adjustable geared motor unit 11, the screw 9 operating on the plastic curd discharged from the plasticising device 5 so as to force it into a cylindrical pipe or nosepiece 46 having a cross-section smaller than that of the cylinder 10, and over which is drawn a stock of tubular sheath 12 which forms the protective covering for the cheese and into which the cheese is extruded; and a cutting and closure device 13 of known type which rhythmically cuts portions of the tubular sheath 12 filled with extruded cheese and closes them by means of metal clips or metal wire, to obtain individual packs 14 (see FIG. 6 in particular).

More specifically, the cutting device 1 comprises a substantially cylindrical vessel 20 which at its top supports an adjustable geared motor unit 21 by means of a set of inclined arms 22 which are spaced apart so as to enable the curd to be loaded from above. The geared motor unit 21 drives a shaft 23 which extends through and is supported in a stationary tube 24 connected at its bottom end to the wall of the vessel 20 by spokes 25. The lower end of the shaft 23 emerges from the stationary tube 24 and carries a plate 26. The plate 26 is provided with a set of inclined blades 27 bent out of the material of the plate 26 itself so as to leave underlying apertures 28 for the discharge of the pieces cut from the curd 29. To enable the curd 29 to be cut (i.e., to prevent it rotating with the plate 26), the curd 29 is made to push against the fixed spokes 25 (see FIG. 5). The cutting device 1 is located at one end of the tank 2 and is supported by it.

The cut fragments of curd 29 fall into the tank 2 where they are kneaded with hot aqueous salt solution by the two screws 3. The solution also contains the whey fed with the curd, and the products (for example fats and mineral salts) which separate from the curd during its transformation into plastic curd. This solution is withdrawn from a reservoir or container 26' (provided with thermostatically controlled heating means, for example electric heating means 27') by means of a pump 28' which feed the solution to a pipe 29' which extends at its ends and along at least part of an opening 31 in the tank 2. The pipe 29' is closed at its end, and comprises a series of liquid outlet apertures 30 disposed in such a manner as to direct the water into the tank 2. The apertures 30 can be controlled by valves, not shown.

The tank 2 comprises a water jacket 32 heated for example by thermostatically controlled resistance heaters to enable to the curd 29 to be kneaded with the water in a hot environment with minimum use of kneading water.

The tank 2, supported by a frame 33, is provided with a bottom outlet controlled by a valve 34 and connected to the reservoir 26' by a pipe 36 to return the liquid to the reservoir 26'.

The curd 29 mixed with the solution is transferred by the screws 3 from the inlet section downstream of the opening 31 lying below the cutting device 1 to an outlet section where the screws 3 operate in a closed environment so as to be able to exert an adequate thrust on the worked product. The environment is closed by simply using a flap 35 which can be raised by rotation about a hinge 36' and which closes a downstream part of the opening 31 in the tank 2. The outlet section comprises a short upwardly inclined channel portion 37 through which the kneaded mass is transferred into a compartment 38 in which the two paddles 6 operate, and which together with the compartment 38 and the geared motor unit 7 form the plasticising device 5. The paddles 6, which have their axes parallel, comprise in this example two pairs of preferably flat arms which extend radially and forwards to follow a broken axis, from a hub 68 keyed on a shaft 39 which emerges from a wall 40 defining one side of the compartment 38. The geared motor unit 7 is rigid with one of the shafts 39. The shaft 39 of the other paddle 6 is, for example, driven by a chain drive 39' from the shaft 39 directly connected to the geared motor unit 7. A pipe 41 is provided at the bottom of the compartment 38 to discharge the liquid unabsorbed by the worked curd 29 into the reservoir 26'.

The kneaded mass is plasticised by the paddles 6 rotated by the geared motor unit 7, and when the level in the compartment 38 exceeds the level of a wall 42 which bounds the compartment 38 on the opposite side from the wall 40, the plastic curd 29 progressively overflows into a duct 43 which leads to the inlet of the underlying extruder 8. The extruder 8 can be heated by a water jacket 44 in which, for example, a thermostatically controlled resistance heater is disposed. The plastic curd 29, which arrives in the extruder 8 practically without water (except for the amount incorporated), is fed by the screw 9 towards the outlet end of the extruder 8. This outlet end comprises a conical section 45 to which the cylindrical pipe or nosepiece 46, which is of substantial length, is connected. The tubular sheath 12 is drawn and gathered-up over the nosepiece 46. The tubular sheath 12 is made from a material suitable for packaging foodstuffs, for example polymer material such as RILSAN (trademark of SNIA VISCOSA) or CRYOVAC (trademark of GRACE). If, as is the case, the end of the tubular sheath 12 facing the outlet of the nosepiece 46 is closed, the hot plastic curd cheese leaving the outlet drags the tubular sheath 12 with it, to fill it. After a certain time (set, for example, on a timer) or after a certain advancement of the tubular sheath 12, as determined by a limit switch, the cutting and closure device 13 is operated. This device may be of known type—for example, the device produced by Poly-Clip GmbH of Frankfurt on Main (German Federal Republic), Model No. FCA 3401. The cutting and closure device 13 device clamps the tubular sheath 12 containing the cheese at two close points, then applies a metal seal or a wire of metal or other material around the two points so that these points become sealed, and then cuts the tubular-sheath 12 at a point between the two seals. A pack of plastic curd cheese is thus obtained, and at the same time the front end of the next pack is closed.

A succession of tubular closed packs is obtained at the outlet of the cutting and closure device 13, and these can be removed from the described plant, for example, by means of a roller conveyor 50.

As plastic curd cheeses require salting for their preservability and taste, the plant comprises a tank 60 in which a concentrated aqueous NaCl solution is prepared. The solution is fed by a metering pump 61 through a pipe 62 to the reservoir 26' so as to salify its contained liquid and compensate for the salt absorbed by the product. The salting operation then takes place in the kneading device, i.e., in the tank 2.

Advantageously, in order to be able to obtain packs of different diameter, the nosepiece 46 (see FIG. 3) is connected to the cylinder 10 in such a manner as to be easily replaceable by another. For this purpose, the conical section 45 is provided with a flange 60' along which slots 61' are distributed. Threaded tie rods 62' hinged at 63 to the cylinder 10 and tightened by wing nuts 64 pass through the slots 61'. The threaded tie rods 62' press against the edges of the slots 61' to clamp the flange 60' against the front face 65 of the cylinder 10.

Figure 1:
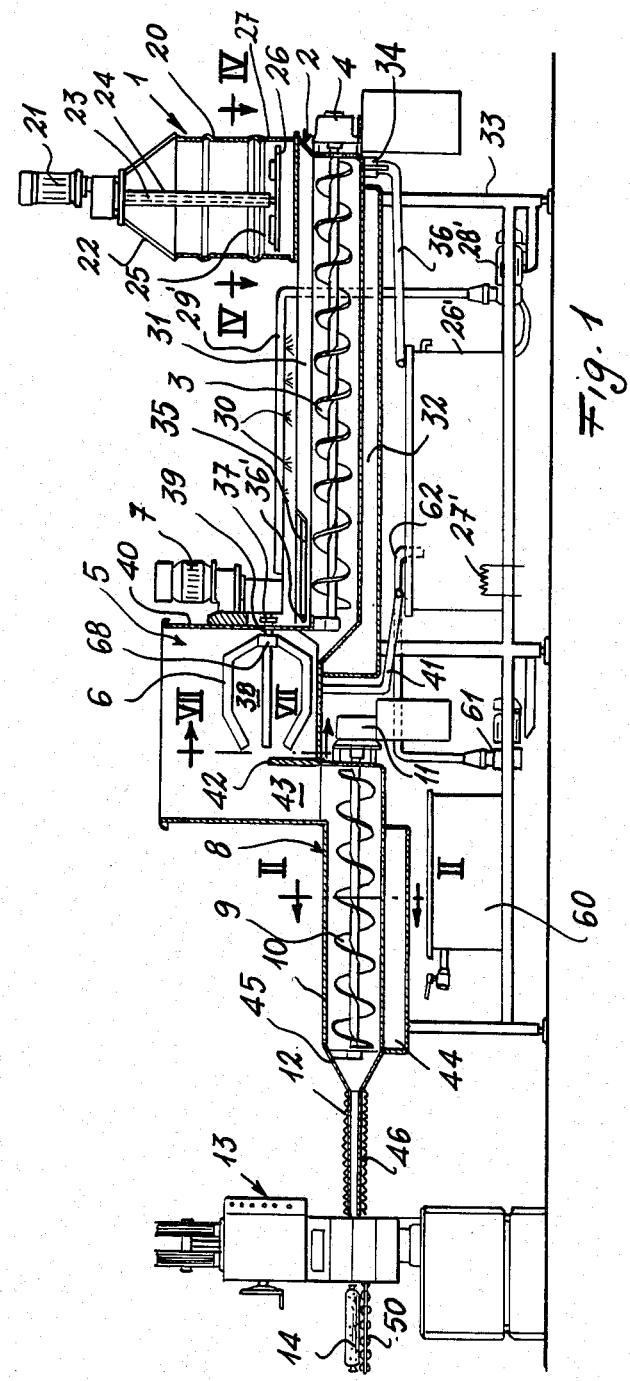
FIG. 1 is a diagrammatic longitudinal section through one embodiment of the invention.
Figure 2:
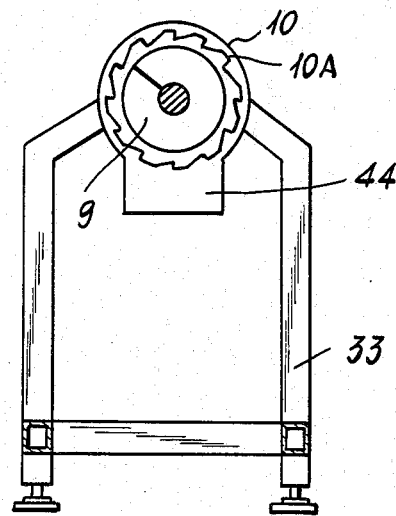
FIG. 2 is a diagrammatic section on the line II—II of FIG. 1.
Figure 3:
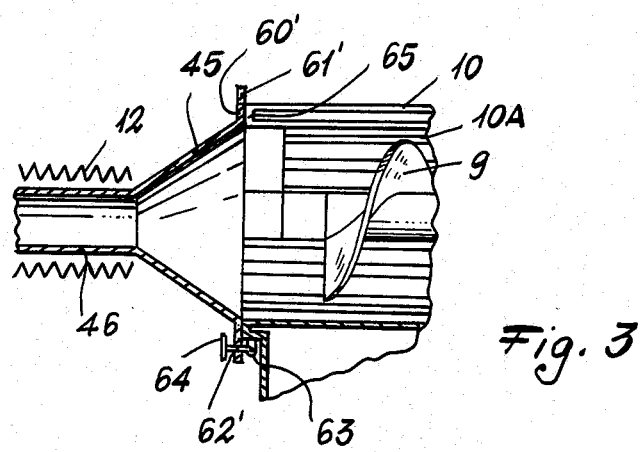
FIG. 3 is a diagrammatic longitudinal section through a detail of the extruder device to a larger scale.
Figure 4:
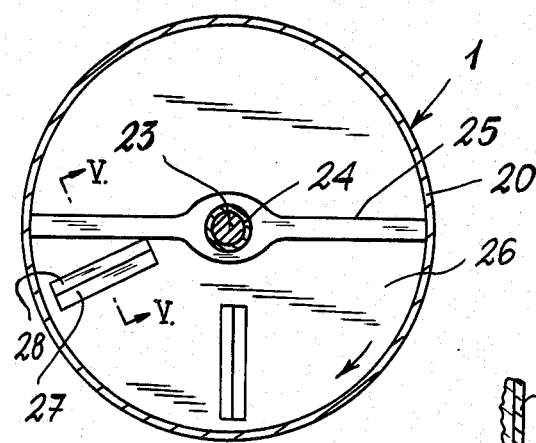
FIG. 4 is a diagrammatic section on the line IV—IV of FIG. 1.
Figure 5:
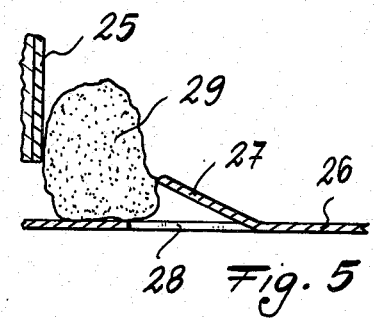
FIG. 5 is a section on the line V—V of FIG. 4.

Advantageously, the inner surface of the cylinder 10 is toothed as indicated by 10A in FIG. 2 so as to prevent the plastic curd 29 being subjected to excessive pressure such as to cause it to break down—i.e., to cause its incorporated moisture to separate from the dry residue.

It has been found that improved results are obtained by cyclically rotating the paddles 6 firstly in one direction and then in the other for times which can be present on a control device such as a timer which controls the geared motor unit 7.

The plant according to the invention has the advantage of dispensing with the use of bulky and costly tanks for the hardening and salting of the plastic curd cheese, and avoiding the need for manual work on the product.

In the modified embodiment of FIG. 9, in which equal or equivalent parts are indicated by the same reference numerals but associated with the letter A, three apparatuses can be seen connected in cascade. One of these comprises the cutting, kneading and plasticising devices, the second is represented by the extruder, and the third is the apparatus which seals and separates the cheese packs. The use of three apparatuses allows greater flexibility in the layout of the plant. For example, the three apparatuses can be in line as shown in FIG. 9, or the extruder and the sealing apparatus can be disposed at a right angle to the remaining apparatus.

In this example, each paddle 6A is connected to a screw 3A which drives it, thus avoiding the use of the geared motor unit 7 of the preceding embodiment.

The plastic curd originating from the paddles 6A is conveyed by the inclined duct 43A into the extruder feed hopper.

What is claimed is:

1. A plant for automatically producing and packaging curd cheeses, said plant comprising:
   (a) first means for cutting curd into pieces;
   (b) a heated elongated tank having an upstream end into which the pieces of curd fall from said first means and a downstream end;
   (c) at least two screws disposed in parallel in said heated elongated tank in position to move the curd from the upstream end to the downstream end of said heated elongated tank;
   (d) second means for spraying brine on the curd as it moves from the upstream end to the downstream end of said heated elongated tank;
   (e) third means for plasticizing the curd cheese, said third means being in direct fluid communication with the downstream end of said heated elongated tank, said third means comprising:
      (i) a compartment;
      (ii) at least two paddles disposed in said compartment; and
      (iii) seventh means for rotating said at least two paddles first in one direction and then in the other direction;
   (f) a screw extruder having an inlet in direct fluid communication with said third means and an outlet, said screw extruder comprising a single screw rotating inside a cylinder having toothed walls;
   (g) a plurality of nosepieces, each one of said plurality of nosepieces:
      (i) having a smaller cross-sectional area than said screw extruder;
      (ii) being selectively substitutable in direct fluid communication with the outlet of said screw extruder; and
      (iii) having an outlet adapted to cooperate with a tubular sheath into which the curd cheese is forced by said screw extruder;
   (h) fourth means located immediately downstream of the one of said plurality of nosepieces that is in direct fluid communication with the outlet of said screw extruder for closing the tubular sheath filled with curd cheese as the tubular sheath comes off said nosepiece and for cutting the tubular sheath where it has been closed to form separate packages containing curd cheese;
   (i) fifth means for recycling brine sprayed by said second means; and
   (j) sixth means for replenishing the salt in the brine as it is consumed in the manufacturing process.

2. A plant as recited in claim 1 and further comprising a first adjustable geared motor unit operatively connected to said at least two screws disposed in parallel in said heated elongated tank.

3. A plant as recited in claim 1 wherein said sevdenth means comprises a second adjustable geared motor unit.

4. A plant as recited in claim 1 and further comprising a third adjustable geared motor unit operatively connected to said single screw comprising said screw extruder.

5. A plant as recited in claim 1 wherein said first means comprise:
   (a) an at least substantially cylindrical vessel;
   (b) a shaft axially disposed within said at least substantially cylindrical vessel;
   (c) a plurality of radially extending blades operatively connected to said shaft;
   (d) a fourth adjustable geared motor operatively connected to said shaft; and
   (e) a plurality of radially extending fixed spokes sized, shaped, and positioned so that, in use, curd is caught between said plurality of radially extending blades and said plurality of radially extending fixed spokes and cannot rotate with said plurality of radially extending blades.

6. A plant as recited in claim 1 wherein said second means comprise:
   (a) a first pipe disposed above said heated elongated tank, said first pipe having a plurality of liquid outlet apertures located so that, in use, the brine is sprayed on the curd;
   (b) a reservoir for the brine;
   (c) thermostatically controlled heating means located in said reservoir;
   (d) a pump that, in use, feeds the brine to said first pipe; and
   (e) a second pipe leading from the bottom of said heated elongated tank back to said reservoir.

7. A plant as recited in claim 1 wherein said heated elongated tank comprises a water jacket heated by thermostatically controlled resistance heaters.

8. A plant as recited in claim 1 wherein said at least two paddles disposed in said compartment have flat arms that extend radially and axially to follow a broken axis.

9. A plant as recited in claim 1 wherein said third means and said screw extruder are separated by a wall that is one side of said compartment, said wall serving as a metering device such that, when the level of the kneaded mass in said compartment exceeds the height of said wall, the kneaded mass progressively overflows into a duct that leads to the inlet of said screw extruder.

10. A plant as recited in claim 1 wherein said screw extruder is heated by a water jacket in which a thermostatically controlled resistance heater is disposed.

* * * * *